United States Patent
Lee et al.

(10) Patent No.: US 9,432,980 B2
(45) Date of Patent: Aug. 30, 2016

(54) APPARATUS AND METHOD FOR INDICATING UPLINK RESOURCE ALLOCATION IN BROADBAND WIRELESS COMMUNICATION SYSTEM

(75) Inventors: Mi-Hyun Lee, Seongnam-si (KR); Hyun-Kyu Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 820 days.

(21) Appl. No.: 13/109,347

(22) Filed: May 17, 2011

(65) Prior Publication Data

US 2011/0280202 A1 Nov. 17, 2011

(30) Foreign Application Priority Data

May 17, 2010 (KR) ........................ 10-2010-0045858

(51) Int. Cl.
*H04W 4/00* (2009.01)
*H04W 72/04* (2009.01)
*H04L 5/00* (2006.01)

(52) U.S. Cl.
CPC ............ *H04W 72/042* (2013.01); *H04L 5/003* (2013.01); *H04L 5/0044* (2013.01); *H04L 5/0007* (2013.01)

(58) Field of Classification Search
CPC .. H04W 72/04; H04W 72/042; H04L 5/003; H04L 5/0044; H04L 5/0007
USPC ........ 370/322, 329, 341, 348, 443; 455/517, 455/219, 225, 551, 560
See application file for complete search history.

(56) References Cited

U.S. PATENT DOCUMENTS

| | | |
|---|---|---|
| 8,010,151 B2 | 8/2011 | Kim et al. |
| 8,782,217 B1* | 7/2014 | Arone et al. ................... 709/224 |
| 2009/0137254 A1 | 5/2009 | Vukovic et al. |
| 2009/0175232 A1* | 7/2009 | Kolding ........................ 370/329 |
| 2009/0262671 A1 | 10/2009 | Seol et al. |
| 2009/0274073 A1 | 11/2009 | Sutton |
| 2010/0111015 A1 | 5/2010 | Kim et al. |

(Continued)

FOREIGN PATENT DOCUMENTS

| | | |
|---|---|---|
| CN | 1878391 A | 12/2006 |
| JP | 2010-56654 A | 3/2010 |

(Continued)

OTHER PUBLICATIONS

Part 16: Air Interface for Fixed and Mobile Broadband Wireless Access Systems, Advanced Air Interface (working document), IEEE WirelessMAN 802.16, Mar. 2008, Jun. 1, 2009, URL: http://ieee802.org/16/tgm/docs/80216m-09_0010r2.zip, retrieved Jan. 27, 2015.

(Continued)

*Primary Examiner* — Abdelnabi Musa
(74) *Attorney, Agent, or Firm* — Jefferson IP Law, LLP (57) ABSTRACT

An apparatus and a method for indicating uplink resource allocation in a broadband wireless communication system are provided. The method includes decoding an UpLink (UL) resource allocation Information Element (IE) in a received DownLink (DL) subframe, extracting an indicator field value from the decoded UL resource allocation IE, the indicator field value indicating a Transmission Time Interval (TTI) type for a resource allocated to the terminal and a UL subframe location, and transmitting UL data through a resource allocated to the terminal based on the extracted indicator field value.

14 Claims, 8 Drawing Sheets

(56) References Cited

U.S. PATENT DOCUMENTS

| | | | |
|---|---|---|---|
| 2011/0035452 A1* | 2/2011 | Gittleman | 709/206 |
| 2012/0060105 A1* | 3/2012 | Brown et al. | 715/753 |
| 2012/0106481 A1* | 5/2012 | Cho et al. | 370/329 |
| 2012/0127897 A1* | 5/2012 | Xu et al. | 370/279 |
| 2012/0147734 A1* | 6/2012 | Kim et al. | 370/216 |
| 2013/0114494 A1* | 5/2013 | Yuk et al. | 370/312 |
| 2014/0129942 A1* | 5/2014 | Rathod | 715/720 |

FOREIGN PATENT DOCUMENTS

| | | |
|---|---|---|
| KR | 10-2009-0110746 A | 10/2009 |
| WO | 2008/094015 A1 | 8/2008 |
| WO | 2009/116790 A2 | 9/2009 |

OTHER PUBLICATIONS

IEEE Computer Society and the IEEE Microwave Theory and Techniques Society, IEEE Standard for Local and Metropolitan Area Networks—Part 16: Air Interface for Broadband Wireless Access Systems—Amendment 3: Advanced Air Interface, ARIB STD-T105, Annex-4, IEEE Std 802.16m-2011, May 6, 2011, IEEE, New York, USA.

Yu et al., Clarification to DL/UL Persistent Allocation (Section 16.3.6.5), IEEE 802.16 Broadband Wireless Access Working Group <http://ieee802.org/16>, Dec. 31, 2009, pp. 1-8, IEEE C802.16m-09/3021, IEEE.

\* cited by examiner

APPARATUS AND METHOD FOR INDICATING UPLINK RESOURCE ALLOCATION IN BROADBAND WIRELESS COMMUNICATION SYSTEM

PRIORITY

This application claims the benefit under 35 U.S.C. §119(a) of a Korean patent application filed in the Korean Intellectual Property Office on May 17, 2010, and assigned Serial No. 10-2010-0045858, the entire disclosure of which is hereby incorporated by reference.

BACKGROUND OF THE INVENTION

1. Field of the Invention

The present invention relates to an apparatus and a method for indicating uplink resource allocation in a broadband wireless communication system. More particularly, the present invention relates to an apparatus and a method for avoiding resource loss when only burst allocation of a particular characteristic (e.g., a long Transmission Time Interval (TTI)) in a Time Division Duplex (TDD) frame including asymmetric links is considered and for indicating burst allocation of various characteristics without additional signaling overhead.

2. Description of the Related Art

A 4$^{th}$ Generation (4G) communication system, which is a next-generation communication system, aims to provide users with services of various Quality of Service (QoS) levels at a data rate of about 100 Mbps. 4G representative communication systems include an Institute of Electrical and Electronics Engineers (IEEE) 802.16 system. The IEEE 802.16 system adopts an Orthogonal Frequency Division Multiplexing (OFDM)/Orthogonal Frequency Division Multiple Access (OFDMA) scheme to support a broadband transmission network over a physical channel.

Broadband wireless communication systems, such as the IEEE 802.16 system, divide one frame into a plurality of subframes in order to support various wireless and service environments.

Figure 1:
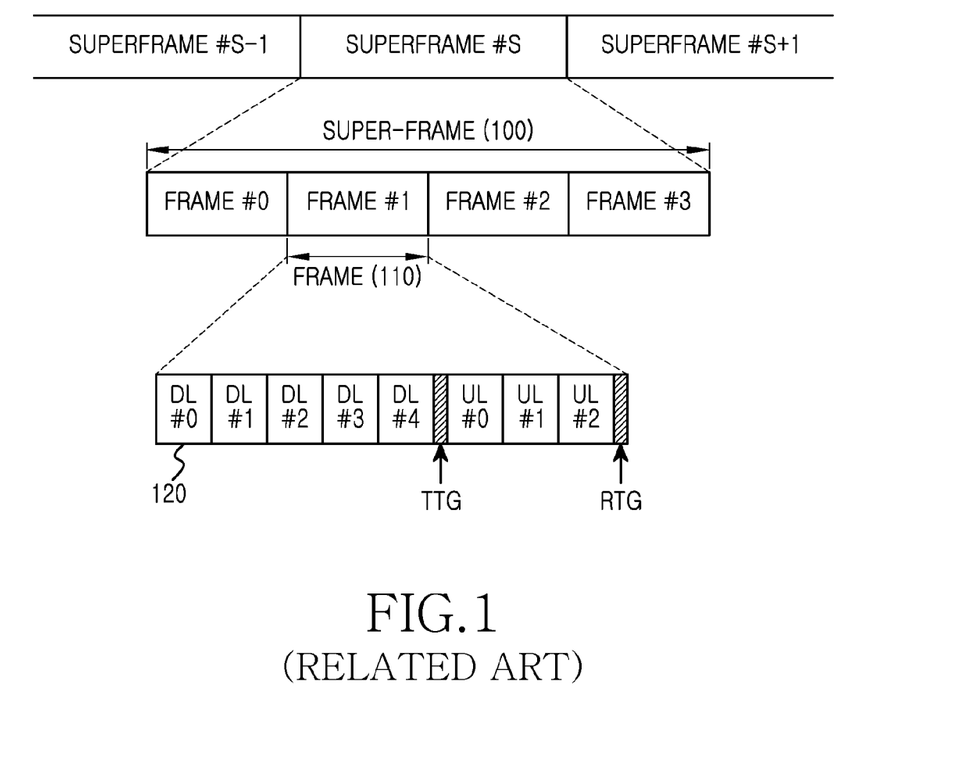
FIG. 1 illustrates a basic frame structure of an Institute of Electrical and Electronics Engineers (IEEE) 802.16 m system according to the related art.

FIG. 1 illustrates a basic frame structure of an IEEE 802.16 m system according to the related art.

Referring to FIG. 1, an IEEE 802.16 m system uses frames based on a superframe 100. The superframe 100 includes a plurality of (e.g., four) frames 110, and the frame 110 includes a plurality of (e.g., eight) subframes 120. In a Time Division Duplex (TDD) frame structure, some (e.g., five) subframes 120 in the frame 110 are operated as DownLink (DL), and the other (e.g., three) subframes 120 are operated as UpLink (UL). A gap (e.g., Transmit/receive Transition Gap (TTG), Receive/transmit Transition Gap (RTG)) for switching is interposed between the links.

Based on such a frame structure, the broadband wireless communication system takes account of burst transmission in each subframe to support short latency, which is referred to as a default Transmission Time Interval (TTI) transmission. The broadband wireless communication system provides the burst transmission of various lengths for the efficient burst transmission according to various wireless and service environments. Specifically, the IEEE 802.16 m system considers the burst transmission length of two characteristics including the default TTI and a long TTI. As stated above, the default TTI indicates the transmission in one subframe and the long TTI indicates the transmission over the plurality of the subframes. In the IEEE 802.16 m system, the length of the long TTI is four frames in a case of a Frequency Division Duplex (FDD) system, and the entire length of the DL or the UL in a case of the TDD system. More particularly, in the D:U TDD system, the length of the DL long TTi is D-ary subframes and the length of the UL long TTI is U-ary subframes.

Burst allocation information of the various transmission lengths is transmitted to a terminal over a DL control channel called an Advanced-MAP (A-MAP) which is provided in the DL subframe. The allocation information includes an Information Element (IE) called A-MAP IE. To indicate the UL default TTI in a certain DL subframe, it is necessary to indicate the UL subframe location including the burst allocation. To indicate a certain UL subframe location in one DL subframe, a number of bits enough to indicate the whole UL subframe index are required. More particularly, when the total number of the UL subframes is eight at maximum, three bits are needed. In addition, one more bit is required to indicate whether the corresponding UL allocation is the long TTI or the default TTI. Namely, signaling overhead of about four bits is required to indicate the burst allocation of the various characteristics in the certain DL subframe.

The A-MAP IE for indicating the burst allocation in the IEEE 802.16 m system includes basic assignment A-MAP IE, persistent assignment A-MAP IE, group assignment A-MAP IE, and Code Division Multiple Access (CDMA) allocation A-MAP IE according to the burst allocation characteristics. The A-MAP IE further includes subband A-MAP IE for discontinuous resource allocation, and feedback polling IE for transmitting feedback information, such as Multiple-Input Multiple-Output (MIMO) feedback. Most of the A-MAP IEs are 56 bits in size (e.g., considering 16-bit Cyclic Redundancy Check (CRC)), the actual information bits are 40 bits) to reduce the decoding complexity. The variable-sized A-MAP IE, such as feedback polling IE, is split and then transmitted. As such, to efficiently fix the size of the A-MAP IE, a method for reducing the signaling overhead is needed.

In this regard, the IEEE 802.16 m system predefines the number and the location of the UL subframes corresponding to the certain DL subframe so as to reduce the signaling overhead. That is, the locations of the subframes for the burst allocation indicated by the A-MAP IEs in the DL subframe are predefined. This correspondence varies based on the ratio of the DL to the UL.

When the single UL subframe corresponds to one or more DL subframes, the UL subframe for the burst allocation indicated by the A-MAP IE transmitted in the DL subframe can be located based on the predefined correspondence without a specific indicator. For example, in the 5:3 TDD frame structure, the DL0 subframe and the DL1 subframe correspond to the UL0 subframe, the DL2 subframe corresponds to the UL1 subframe, and the DL3 subframe and the DL4 subframe correspond to the UL2 subframe. When one DL subframe corresponds to one UL subframe, the UL subframe for the burst allocation indicated by the A-MAP IE sent over the DL subframe can be located non-explicitly. Accordingly, a particular indicator for indicating one UL subframe location in the UL subframes is unnecessary.

In contrast, when one DL subframe corresponds to the multiple UL subframes, a particular indicator is necessary to indicate one UL subframe location in the corresponding UL subframes.

Figure 2A:
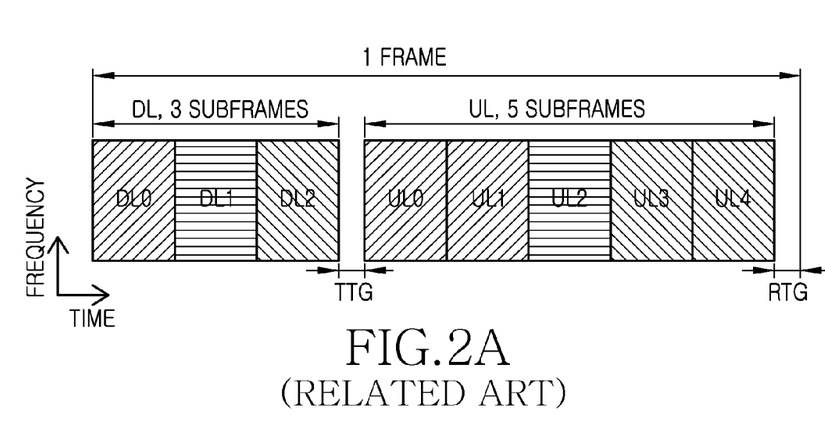
FIGS. 2A and 2B illustrate a Time Division Duplex (TDD) frame structure when one DownLink (DL) subframe corresponds to multiple UpLink (UL) subframes in an IEEE 802.16 m system according to the related art.
Figure 2B:
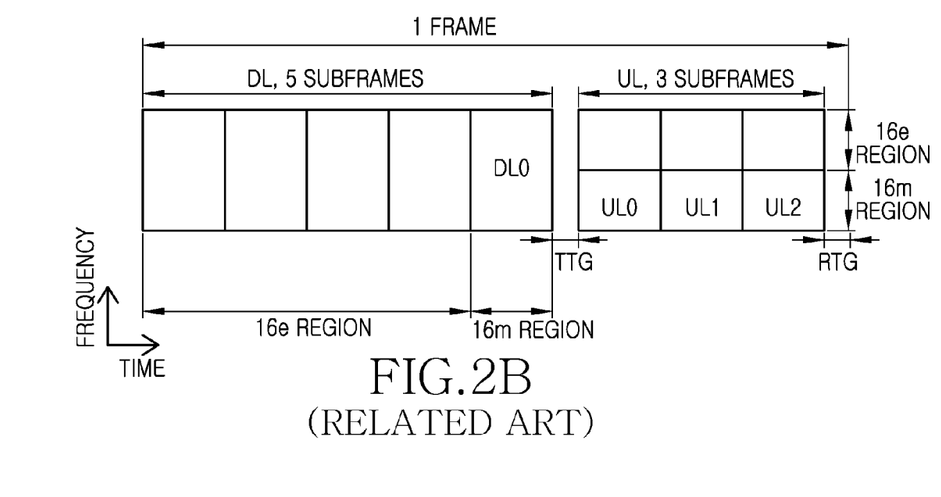

FIGS. 2A and 2B illustrate a TDD frame structure when one DL subframe corresponds to multiple UL subframes in an IEEE 802.16 m system according to the related art.

Referring to FIGS. 2A and 2B, in a 3:5 TDD 802.16 m frame structure, the DL0 subframe corresponds to the UL0 subframe and the UL1 subframe, the DL1 subframe corresponds to the UL2 subframe, and the DL2 subframe corresponds to the UL3 subframe and the UL4 subframe. When one DL subframe corresponds to two UL subframes at maximum, a particular indicator is required to distinguish two UL subframes at maximum for indicating one UL subframe location among the corresponding UL subframes.

In the 5:3 TDD 802.16 e/16 m coexistence support frame structure of FIG. 2B, when the 802.16 m region occupies a D:U=1:3 region in one frame, the DL0 subframe corresponds to the UL0 subframe through the UL2 subframe. As such, when one DL subframe corresponds to three UL subframes, a particular indicator for distinguishing the three UL subframes at maximum is required to indicate one UL subframe location of the corresponding UL subframes. Herein, the indication of the certain subframe among the corresponding subframes is referred to as allocation relevance.

As the number and the location of the UL subframes corresponding to one DL subframe vary based on the ratio of the DL to the UL, the signaling (i.e., the particular indicator) is necessary to indicate the one UL subframe location amongst the corresponding UL subframes. Signaling information according to the ratio of the DL to the UL should be decoded such that the corresponding A-MAP IEs are of the fixed size. The burst transmission can have the default TTI or long TTI characteristic, which need to be distinguished.

To address those drawbacks, when one DL subframe corresponds to the multiple UL subframes in the IEEE 802.16 m system, a method for considering only the long TTI in the UL allocation is suggested to avoid the signaling overhead for the indicator which indicates the allocation relevance in the default TTI support. More specifically, when the number of the DL subframes is greater than or equal to the number of the UL frames, the 802.16 m system supports both of the default TTI and the long TTI and indicates the default TTI or the long TTI using a long TTI indicator. As for the default TTI, the corresponding subframe can be located based on the predefined correspondence. In contrast, when the number of the DL subframes is smaller than the number of the UL frames, the 802.16 m system supports the long TTI alone and the A-MAP IE includes 1-bit long TTI indicator.

Figure 3:
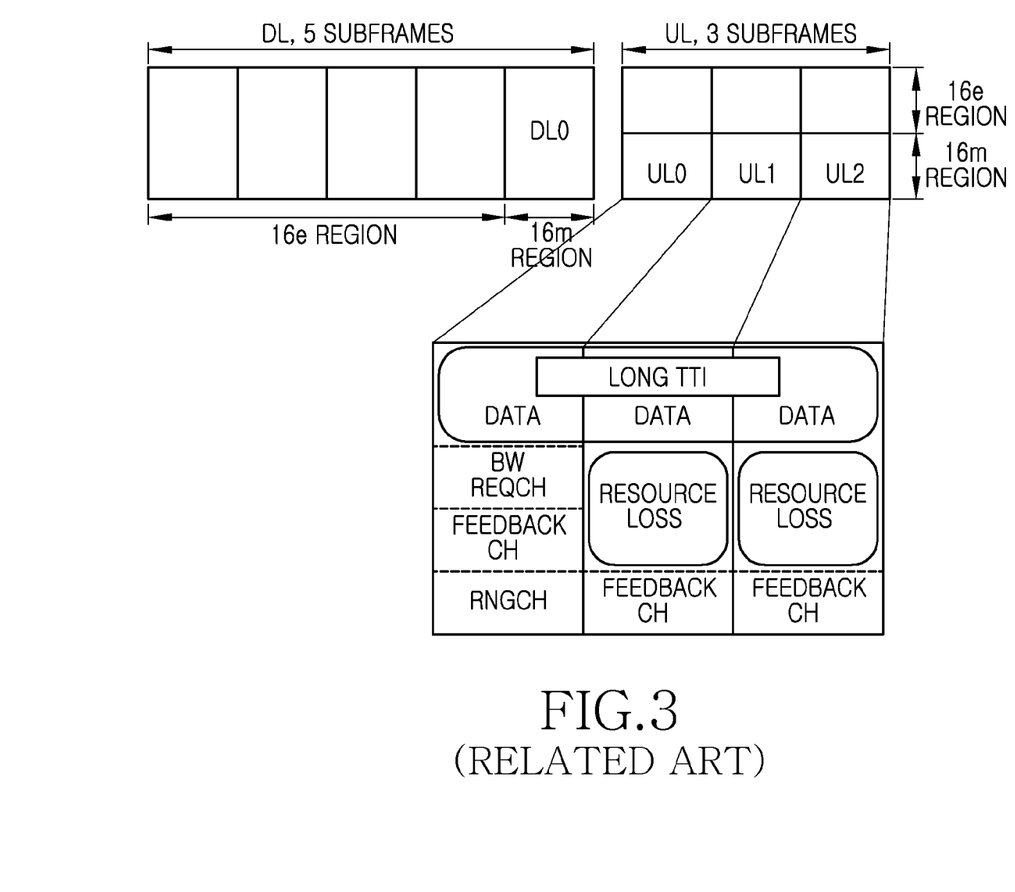
FIG. 3 illustrates disadvantages in burst allocation indication of a particular characteristic in a TDD 802.16 e/16 m coexistence support frame structure when one DL subframe corresponds to multiple UL subframes in an IEEE 802.16 m system according to the related art.

FIG. 3 illustrates disadvantages in burst allocation indication of a particular characteristic in a TDD 802.16 e/16 m coexistence support frame structure when one DL subframe corresponds to multiple UL subframes in an IEEE 802.16 m system according to the related art.

Referring to FIG. 3, in a 5:3 TDD 802.16 e/16 m coexistence support frame structure, a UL control channel, such as RaNGing Channel (RNGCH) or BandWidth REQuest Channel (BW REQ CH), resides in a specific UL subframe (e.g., the first UL subframe) in a cycle, rather than in every UL frame. Herein, when only the long TTI is considered for the UL allocation, the same resource index as the resource occupied by the UL control channel in the other UL subframe is unusable according to the RNGCH or the BW REQ CH in the specific UL subframe. That is, although there is no UL control channel, the other UL subframe cannot use the same region as the resource occupied by the UL control channel for the burst allocation, which causes resource loss.

For instance, when one UL subframe includes 48 Logical Resource Units (LRUs) base on the BandWidth (BW) of 10 Mhz in the 3:5 TDD 802.16 m frame structure, four LRUs are used as the RNGCH, and the RNGCH resides in one UL subframe, the corresponding frame is subject to the resource loss of approximately 6% (=4*4/(5*48)) by considering only the long TTI for the UL allocation.

In the 5:3 TDD 802.16 e/16 m coexistence support frame structure, when the 802.16m region occupies a D:U=1:3 region in the frame, one UL subframe includes 35 LRUs based on the BW of 10 Mhz, six LRUs are used as the RNGCH, and the RNGCH resides in one UL subframe, the corresponding frame is subject to the resource loss of approximately 11% (=2*6/(35*3)) by considering only the long TTI for the UL allocation.

Therefore, a need exists for a burst allocation indication method for reducing the signaling overhead for the burst allocation indication and for avoiding the resource loss when only the burst allocation of a particular characteristic (e.g., the long TTI) is considered.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for indicating uplink resource allocation in a broadband wireless communication system.

Another aspect of the present invention is to provide an apparatus and a method for indicating burst allocation of various characteristics without additional signaling overhead by using an indicator which indicates not only a location of an UpLink (UL) subframe (e.g., a first UL subframe, a second UL subframe, and a third UL subframe) for the burst allocation indicated by an Advanced-MAP (A-MAP) Information Element (IE) transmitted over a DownLink (DL) subframe but also a burst transmission characteristic (e.g., default Transmission Time Interval (TTI) and long TTI) based correspondence of DL subframes and UL subframes defined by various ratios of the DL to the UL in a Time Division Duplex (TDD) frame including asymmetric links in a broadband wireless communication system.

According to an aspect of the present invention, an operating method of a terminal for transmitting data according to resource allocation in a wireless communication system is provided. The method includes decoding a UL resource allocation IE in a received DL subframe, extracting an indicator field value from the decoded UL resource allocation IE, the indicator field value indicating a Transmission Time Interval (TTI) type for a resource allocated to the terminal and a UL subframe location, and transmitting UL data through a resource allocated to the terminal based on the extracted indicator field value.

According to another aspect of the present invention, an operating method of a base station for allocating a resource in a wireless communication system is provided. The method includes allocating a resource to a terminal through scheduling, determining an indicator field value which indicates a TTI type for the resource allocated to the terminal and a UL subframe location, and generating a UL resource allocation IE comprising the determined indicator field value.

According to another aspect of the present invention, an apparatus of a terminal for transmitting data according to resource allocation in a wireless communication system is provided. The apparatus includes a message analyzer for decoding a UL resource allocation IE in a received DL subframe and for extracting an indicator field value from the decoded UL resource allocation IE, the indicator field value indicating a TTI type for a resource allocated to the terminal and a UL subframe location, and a Radio Frequency (RF) transmitter for transmitting UL data through a resource allocated to the terminal based on the extracted indicator field value.

According to another aspect of the present invention, an apparatus of a base station for allocating a resource in a wireless communication system is provided. The apparatus includes a scheduler for allocating a resource to a terminal through scheduling, and a message generator for determining an indicator field value which indicates a TTI type for the resource allocated to the terminal and a UL subframe location, and for generating a UL resource allocation IE comprising the determined indicator field value.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for indicating UpLink (UL) resource allocation in a broadband wireless communication system.

Hereinafter, an Orthogonal Frequency Division Multiplexing (OFDM)/Orthogonal Frequency Division Multiple Access (OFDMA) wireless communication system is exemplified. The present invention is equally applicable to other wireless communication systems.

FIGS. 4 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Exemplary embodiments of the present invention provide a 2-bit indicator Transmission Time Interval (TTI) and Relevance field which indicates not only a location of a UL subframe (e.g., a first UL subframe, a second UL subframe, and a third UL subframe) for burst allocation indicated by an Advanced-MAP (A-MAP) Information Element (IE) transmitted over a DownLink (DL) subframe, but also burst transmission characteristic (e.g., default TTI, long TTI) based on correspondence of the DL subframes and the UL subframes defined according to various ratios of the DL and the UL in a Time Division Duplex (TDD) frame including asymmetric links in a broadband wireless communication system.

Herein, the TTI and Relevance field can be defined to attain the following characteristics according to its bit value. While it is assumed that the number of UL subframes corresponding to a certain DL subframe is smaller than three, note that the number of the corresponding UL frames can exceed three. In this case, the TTI and Relevance field has two or more bits.

0b00: long TTI
0b01: default TTI, the first UL subframe within UL subframes corresponding to the DL subframe through which this A-MAP IE is transmitted
0b10: default TTI, the second UL subframe within UL subframes corresponding to the DL subframe through which this A-MAP IE is transmitted
0b11: default TTI, the third UL subframe within UL subframes corresponding to the DL subframe through which this A-MAP IE is transmitted By indicating the burst allocation using the TTI and Relevance defined as such, the burst allocation of various characteristics can be indicated through lower-bit signaling than the 4-bit signaling of the related art.

The 2-bit TTI and Relevance field, which is contained in a certain UL A-MAP IE indicating the UL allocation, indicates a transmission length (i.e., burst transmission characteristic) of the burst transmitted in the UL allocation, and a transmission location (i.e., a location of the UL subframe for the burst allocation indicated by the A-MAP IE transmitted in the DL subframe). Herein, the certain UL A-MAP IE can include basic assignment A-MAP IE, persistent assignment A-MAP IE, group assignment A-MAP IE, Code Division Multiple Access (CDMA) allocation A-MAP IE, subband A-MAP IE, and feedback polling IE.

For example, the persistent assignment A-MAP IE can be constituted in the present method as shown in Table 1. That is, the same bits as in the method of the related art can be used to indicate the location and the burst transmission characteristics of the UL subframe corresponding to the certain DL subframe in the TDD frame structure including the asymmetric links supported in Institute of Electrical and Electronics Engineers (IEEE) 802.16 communication system.

TABLE 1

| Syntax | Size (bit) | Description/notes |
|---|---|---|
| UL Persistent A-MAP IE ( ) { | | |
| A-MAP IE Type | 4 | UL Persistent Allocation A-MAP IE |
| Allocation period | 2 | Period of persistent allocation 0b00: deallocation 0b01: 2 frames 0b10: 4 frames 0b11: 8 frames |
| If (Allocation period == 0b00) { | | Deallocation |
| Resource index | 11 | |
| TTI and Relevance | 2 | Indicates the TTI type and the location of UL subframe about this allocation 0b00: long TTI 0b01: default TTI, the first UL subframe within UL subframes corresponding to current DL subframe 0b10: default TTI, the second UL subframe within UL subframes corresponding to current DL subframe 0b11: default TTI, the third UL subframe within UL subframes corresponding to current DL subframe |
| HFA | 6 | |
| Reserved | 15 | |
| } else { | | |
| $I_{sizeOffset}$ | 5 | Offset used to compute burst size index |
| Mt | 1 | Number of streams per Advanced Mobile Station (AMS) supported 0b0: 1 stream 0b1: 2 streams |
| TNS | 2 | Total number streams in the Logical Resource Unit (LRU) for Collaborative Spatial Multiplexing (CSM) |
| If(TNS > Mt) { | | |
| SI | 2 | First pilot index for CSM with Total Number of Streams (TNS) = 2 streams: 0b00, 0b01 First pilot index for CSM with TNS = 3, 4 streams: 0b00, 0b01, 0b10, 0b11 |
| } else if (TNS ==Mt) { | | |
| MEF | 1 | Multiple Input Multiple Output (MIMO) encoder format 0b0: Space Frequency Block Code (SFBC) 0b1: Vertical Encoding (VE) |
| Reserved | 1 | |
| } | | |
| PF | 1 | Precoding flag 0b0: nonadaptive precoding 0b1: adaptive precoding using the precoder of rank Mt of the AMS's choice |
| Resource index | 11 | Resource index included location and allocation size |
| TTI and Relevance | 2 | Indicates the TTI type and the location of UL subframe about this allocation 0b00: long TTI 0b01: default TTI, the first UL subframe within UL subframes corresponding to current DL subframe 0b10: default TTI, the second UL subframe within UL subframes corresponding to current DL subframe 0b11: default TTI, the third UL subframe within UL subframes corresponding to current DL subframe |
| HFA | 3 | Hybrid Automatic Repeat Request (HARQ) feedback allocation |
| N_ACID | 2 | Number of Automatic Repeat Request (ARQ) Channel IDentifiers (ACIDs) for implicit cycling of HARQ channel identifier |

TABLE 1-continued

| Syntax | Size (bit) | Description/notes |
|---|---|---|
| | | 0b00: 2 |
| | | 0b01: 3 |
| | | 0b10: 4 |
| | | 0b11: 8 |
| Initial_ACID | 4 | initial HARQ channel identifier |
| Reserved | 1 | |
| } | | |
| } | | |

Referring to Table 1, A-MAP IEs, including long TTI and relevance using field content change and reserved bit of the related art, can indicate various burst characteristics without additional signaling overhead.

Figure 4:
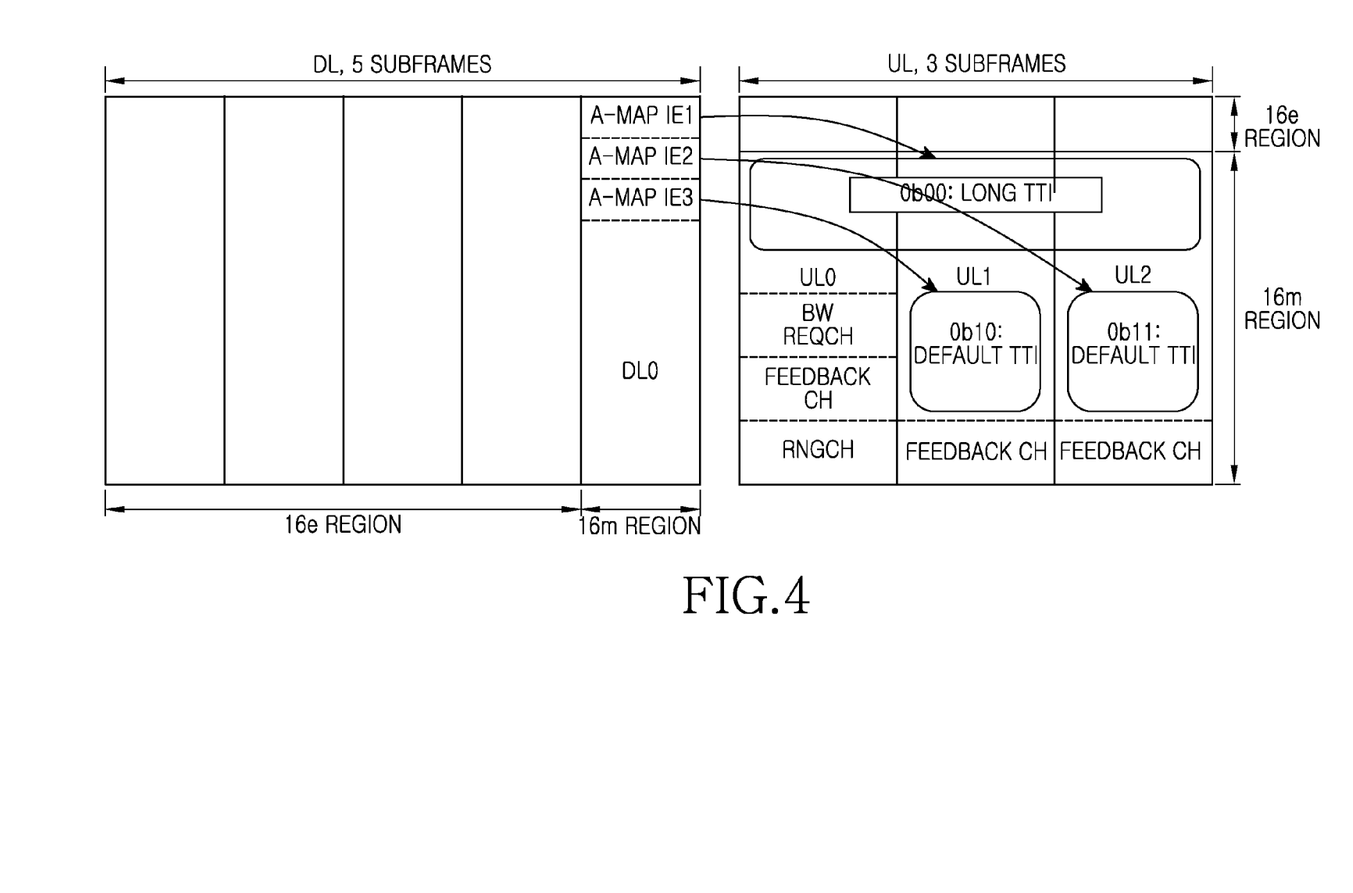
FIG. 4 illustrates a method for indicating burst allocation of various characteristics in a TDD 802.16 e/16 m coexistence support frame structure when one DL subframe corresponds to multiple UL subframes in an IEEE 802.16 m system according to an exemplary embodiment of the present invention.

FIG. 4 illustrates a method for indicating burst allocation of various characteristics in a TDD 802.16 e/16 m coexistence support frame structure when one DL subframe corresponds to multiple UL subframes in an IEEE 802.16 m system according to an exemplary embodiment of the present invention.

Referring to FIG. 4, in a 5:3 TDD 802.16 e/16 m coexistence support frame structure, when 802.16 m region occupies a D:U=1:3 region in the frame, A-MAP IEs transmitted over the DL0 subframe can indicate not only the long TTI but also the default TTI in the first subframe, the default TTI in the second subframe, and the default TTI in the third subframe using the 2-bit indicator TTI and Relevance.

Figure 5:
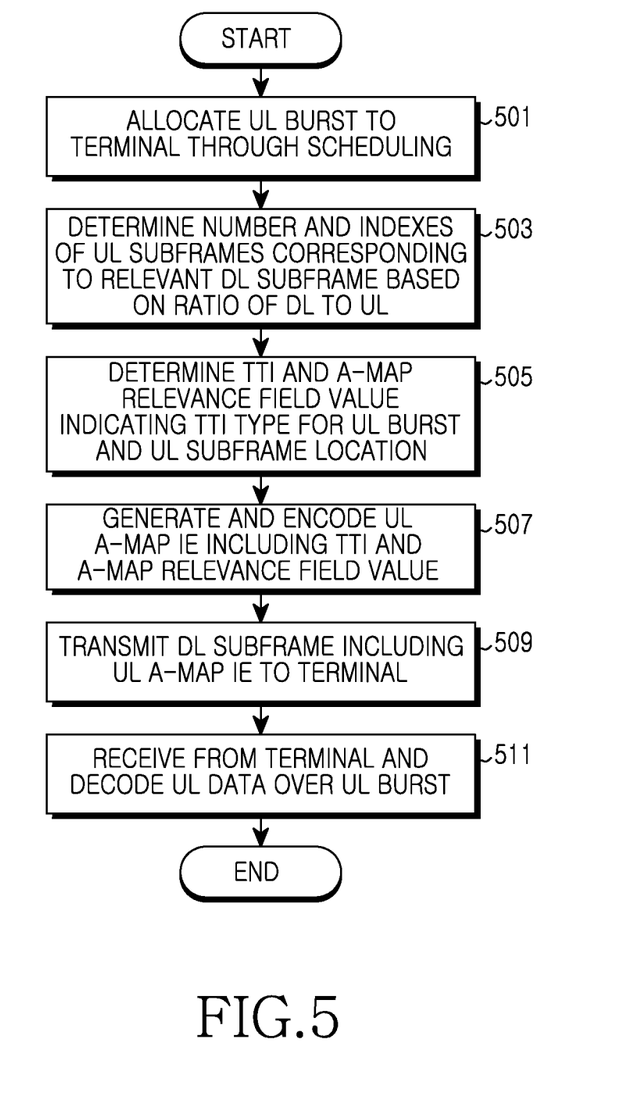
FIG. 5 is a flowchart illustrating a method of a base station for allocating a UL resource using a UL Advanced-MAP (A-MAP) Information Element (IE) including a Transmission Time Interval (TTI) and Relevance field in a broadband wireless communication system according to an exemplary embodiment of the present invention.

FIG. 5 is a flowchart illustrating a method of a base station for allocating a UL resource using a UL A-MAP IE including a TTI and Relevance field in a broadband wireless communication system according to an exemplary embodiment of the present invention.

Referring to FIG. 5, in step 501, a base station allocates a UL burst to a terminal by scheduling resources for the UL subframe.

According to the ratio of the DL to the UL, the base station determines the number and the indexes of UL subframes corresponding to the DL subframe to include the A-MAP IE for the UL burst allocated to the terminal in step 503. Herein, the correspondence of the DL subframes and the UL subframes based on the ratio of the DL and the UL can be pre-stored as a look-up table and referred by the base station, or determined by the base station based on a predefined equation.

In step 505, based on the number and the indexes of the UL subframes corresponding to the DL subframe, the base station determines the TTI and A-MAP relevance field value indicating the TTI type (i.e., the transmission length of the UL burst) for the UL burst allocated to the terminal and the location of the UL subframe (i.e., the transmission location of the UL burst). For example, the TTI and A-MAP relevance field value can be defined to indicate one of the long TTI, the default TTI and the corresponding first UL subframe, the default TTI and the corresponding second UL subframe, and the default TTI and the corresponding third UL subframe. Herein, the TTI and A-MAP relevance field value indicating the long TTI indicates that the TTI type for the UL burst allocated to the terminal is the long TTI and that the location of the UL subframe for the UL burst allocated to the terminal is the UL subframe corresponding to the DL subframe or the long TTI region starting from the first UL subframe of the UL subframes corresponding to the DL subframe. The TTI and A-MAP relevance field value indicating the default TTI and the corresponding first UL subframe indicates that the TTI type for the UL burst allocated to the terminal is the default TTI and that the location of the UL subframe for the UL burst allocated to the terminal is the first UL subframe of the UL subframes corresponding to the DL subframe. Similarly, the TTI and A-MAP relevance field value indicating the default TTI and the corresponding second UL subframe indicates that the TTI type for the UL burst allocated to the terminal is the default TTI and that the location of the UL subframe for the UL burst allocated to the terminal is the second UL subframe of the UL subframes corresponding to the DL subframe. The TTI and A-MAP relevance field value indicating the default TTI and the corresponding third UL subframe indicates that the TTI type for the UL burst allocated to the terminal is the default TTI and that the location of the UL subframe for the UL burst allocated to the terminal is the third UL subframe of the UL subframes corresponding to the DL subframe.

In step 507, the base station generates UL A-MAP IE including the determined TTI and A-MAP relevance field value, and encodes the generated UL A-MAP IE.

In step 509, the base station transmits a DL subframe including the encoded UL A-MAP IE to the terminal.

In step 511, the base station receives UL data from the terminal through the UL burst allocated to the terminal and decodes the received UL data.

Thereafter, the base station completes this process.

Figure 6:
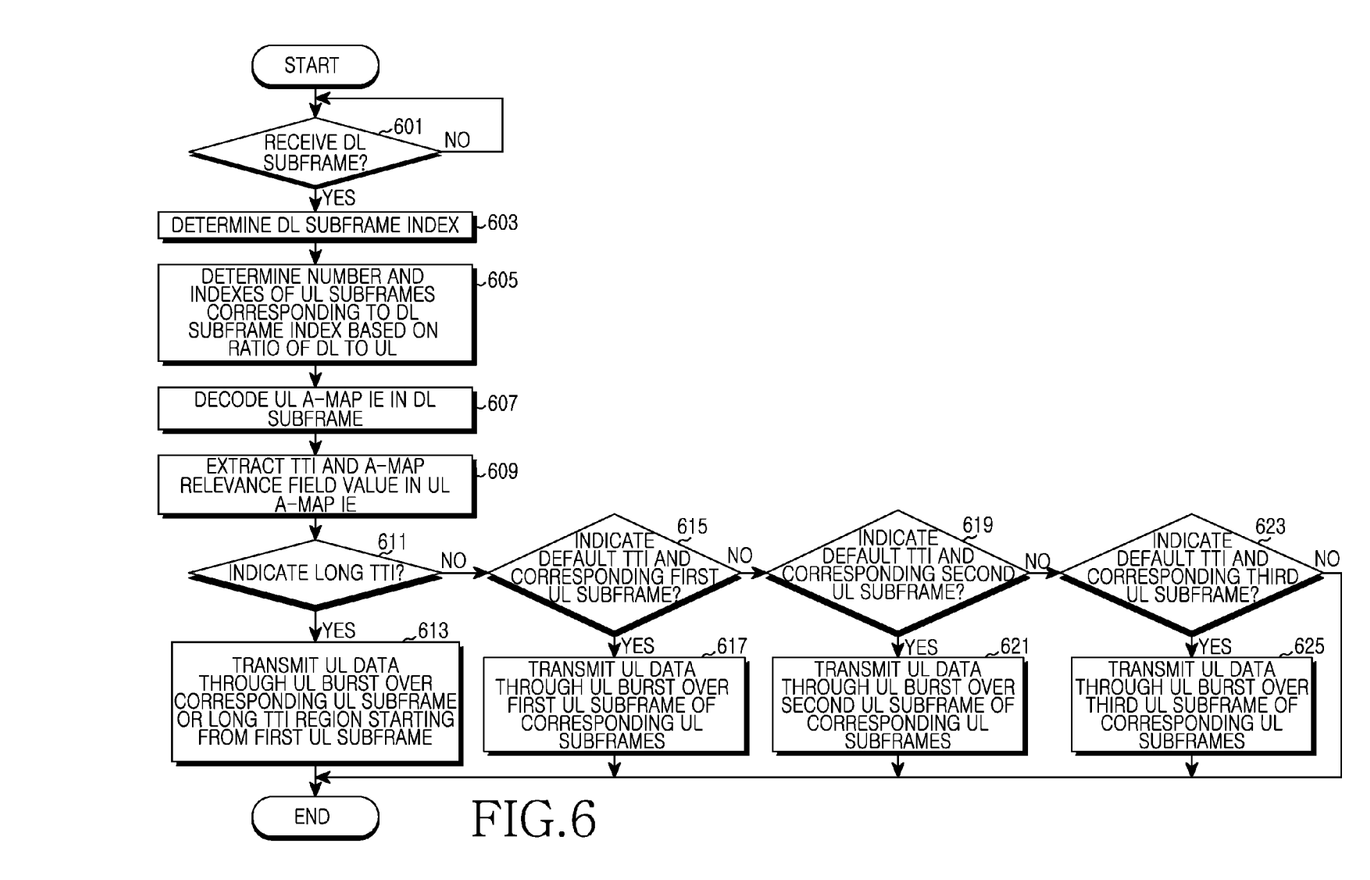
FIG. 6 is a flowchart illustrating a method of a terminal for allocating a UL resource through a UL A-MAP IE including a TTI and Relevance field in a broadband wireless communication system according to an exemplary embodiment of the present invention.

FIG. 6 is a flowchart illustrating a method of a terminal for allocating UL resource through UL A-MAP IE including a TTI and Relevance field in a broadband wireless communication system according to an exemplary embodiment of the present invention.

Referring to FIG. 6, in step 601, a terminal determines whether a DL subframe is received from the base station.

If it is determined in step 601 that the DL subframe has been received from the base station, the terminal determines the index of the received DL subframe in step 603.

In step 605, the terminal determines the number and the indexes of the UL subframes corresponding to the determined DL subframe index based on the ratio of the DL to the UL. Herein, the number and the indexes of the UL subframes corresponding to one DL subframe vary depending on the ratio of the DL to the UL. Herein, the DL subframe index can be determined using a preamble detected at a predefined location in the received DL subframe. The correspondence of the DL subframes and the UL subframes based on the ratio of the DL to the UL can be pre-stored as a look-up table and referred by the terminal, or determined by the terminal based on a predefined equation. Herein, the ratio of the DL to the UL can be obtained from control information relating to a frame constitution transmitted from the base station on a periodic basis (e.g., every superframe) or in the event-trigger manner.

In step 607, the terminal decodes the UL A-MAP IE in the received DL subframe.

In step 609, the terminal extracts the TTI and A-MAP relevance field value from the decoded UL A-MAP IE.

Based on the number and the indexes of the UL subframes corresponding to the DL subframe index determined, the terminal transmits UL data through its allocated UL burst according to the TTI type (i.e., the transmission length of the UL burst) for the UL burst allocated to the terminal and the UL subframe location (i.e., the transmission location of the UL burst) which are indicated by the extracted TTI and A-MAP relevance field value in steps 611 through 625.

More specifically, the terminal determines whether the extracted TTI and A-MAP relevance field value indicates the long TTI in step 611. If it is determined in step 611 that the extracted TTI and A-MAP relevance field value indicates the long TTI, the terminal transmits UL data to the base station through its allocated UL burst over the UL subframe corresponding to the received DL subframe or the long TTI region starting from the first UL subframe of the UL subframes corresponding to the received DL subframe in step 613. In contrast, if it is determined in step 611 that the extracted TTI and A-MAP relevance field value does not indicate the long TTI, the terminal determines whether the extracted TTI and A-MAP relevance field value indicates the default TTI and the corresponding first UL subframe in step 615. When the extracted TTI and A-MAP relevance field value indicates the default TTI and the corresponding first UL subframe in step 615, the terminal transmits the UL data to the base station through its allocated UL burst in the first UL subframe of the UL subframes corresponding to the received DL subframe in step 617. When the extracted TTI and A-MAP relevance field value does not indicate the default TTI and the corresponding first UL subframe in step 615, the terminal examines whether the extracted TTI and A-MAP relevance field value indicates the default TTI and the corresponding second UL subframe in step 619. When the extracted TTI and A-MAP relevance field value indicates the default TTI and the corresponding second UL subframe in step 619, the terminal transmits the UL data to the base station through its allocated UL burst in the second UL subframe of the UL subframes corresponding to the received DL subframe in step 621. In contrast, when the extracted TTI and A-MAP relevance field value does not indicate the default TTI and the corresponding second UL subframe in step 619, the terminal determines whether the extracted TTI and A-MAP relevance field value indicates the default TTI and the corresponding third UL subframe in step 623. When the extracted TTI and A-MAP relevance field value indicates the default TTI and the corresponding third UL subframe in step 623, the terminal transmits the UL data to the base station through its allocated UL burst in the third UL subframe of the UL subframes corresponding to the received DL subframe in step 625. In contrast, when the extracted TTI and A-MAP relevance field value does not indicate the default TTI and the corresponding third UL subframe in step 623, the terminal completes this process. The determination on the TTI and A-MAP relevance field value can be carried out in parallel and thus it is possible to directly determine the allocation indicated by the TTI and A-MAP relevance field value.

Figure 7:
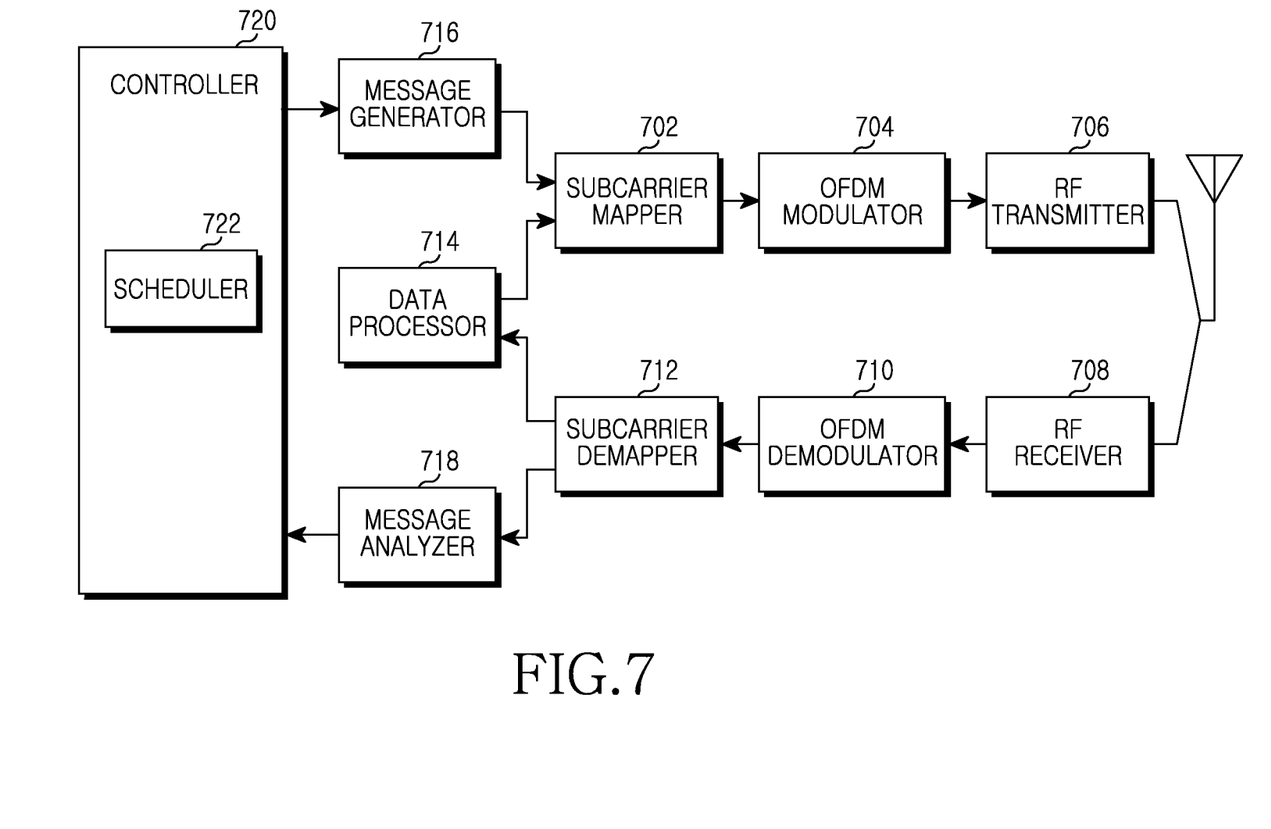
FIG. 7 is a block diagram of a base station in a broadband wireless communication system according to an exemplary embodiment of the present invention.

FIG. 7 is a block diagram of a base station in a broadband wireless communication system according to an exemplary embodiment of the present invention.

Referring to FIG. 7, a base station includes a subcarrier mapper 702, an OFDM modulator 704, a Radio Frequency (RF) transmitter 706, an RF receiver 708, an OFDM demodulator 710, a subcarrier demapper 712, a data processor 714, a message generator 716, a message analyzer 718, and a controller 720.

The subcarrier mapper 702 maps data signals output from the data processor 714 and message signals output from the message generator 716 to subcarriers. The OFDM modulator 704 converts the signals mapped to the subcarriers to time-domain signals using Inverse Fast Fourier Transform (IFFT) and constitutes OFDM symbols by inserting Cyclic Prefix (CP). The RF transmitter 706 up-converts the OFDM symbols to an RF signal and transmits the RF signal over an antenna.

The RF receiver 708 converts an RF signal received via the antenna to a baseband signal. The OFDM demodulator 710 divides the baseband signal into OFDM symbols, removes the CP, and then restores the signals per subcarrier using Fast Fourier Transform (FFT). The subcarrier demapper 712 classifies the subcarrier signals based on the processing unit, and provides the data signals to the data processor 714 and the message signals to the message analyzer 718.

The data processor 714 restores the receive data bit sequence by demodulating and channel-decoding the data signals, and generates transmit data signals by channel-encoding and modulating the transmit data bit sequence.

The message analyzer 718 restores the message bit sequence from the message signals received from the terminal. The message analyzer 718 confirms information contained in the corresponding message signals by analyzing the message bit sequence, and provides the confirmed information to the controller 720.

The message generator 716 generates a message bit sequence including the information fed from the controller 720, and generates physical message signals based on the message bit sequence. More particularly, the message generator 716 generates the A-MAP IE according to the resource scheduling result provided from the controller 720.

The controller 720 controls functions of the base station. For example, the controller 720 controls the subcarrier demapper 712 to extract the data signals per terminal according to the UL resource scheduling result, and controls the subcarrier mapper 702 to map the terminal data signals according to the DL resource scheduling result. The controller 720 performs the processing corresponding to the information confirmed by the message analyzer 718, and provides the information contained in the transmit message to the message generator 716. A scheduler 722 of the controller 720 schedules the resources.

The operations of those blocks are explained below.

The scheduler 722 of the controller 720 allocates the terminals the UL burst through the resource scheduling of the UL subframe and provides the resource scheduling result to the message generator 716. Thus, the message generator 716 generates the UL A-MAP IEs for the terminals. More specifically, the message generator 716 selects the terminal to generate the UL A-MAP IE and determines the number and the indexes of the UL subframes corresponding to the DL subframe to carry the UL A-MAP IE for the UL burst allocated to the selected terminal according to the ratio of the DL to the UL. Herein, the correspondence of the DL subframes and the UL subframes based on the ratio of the DL to the UL can be pre-stored as the look-up table and referred by the message generator 716, or determined by the message generator 716 based on the predefined equation. Thereafter, based on the number and the indexes of the UL subframes corresponding to the DL subframe, the message generator 716 determines the TTI and A-MAP relevance field value indicating the TTI type (i.e., the transmission length of the UL burst) for the UL burst allocated to the selected terminal and the UL subframe location (i.e., the transmission location of the UL burst). For example, the TTI and A-MAP relevance field value can be defined to indicate one of the long TTI, the default TTI and the corresponding first UL subframe, the default TTI and the corresponding second UL subframe, and the default TTI and the corresponding third UL subframe. Thereafter, the message generator 716 generates the UL A-MAP IE including the determined TTI and A-MAP relevance field value. When the generation of the UL A-MAP IE for the terminals is completed, the message generator 716 divides and encodes the UL A-MAP IEs to particular sequences of the terminals, converts to the complex symbols, and provides the complex symbols to the subcarrier mapper 702. The subcarrier mapper 702 maps the signal of the UL A-MAP IEs to the subcarriers, and the OFDM modulator 704 and the RF transmitter 706 transmit to the terminals the DL subframe including the signal of the UL A-MAP IEs mapped to the subcarriers. The RF receiver 708 then receives the UL data signals from the terminals through the UL burst allocated to the terminals.

Figure 8:
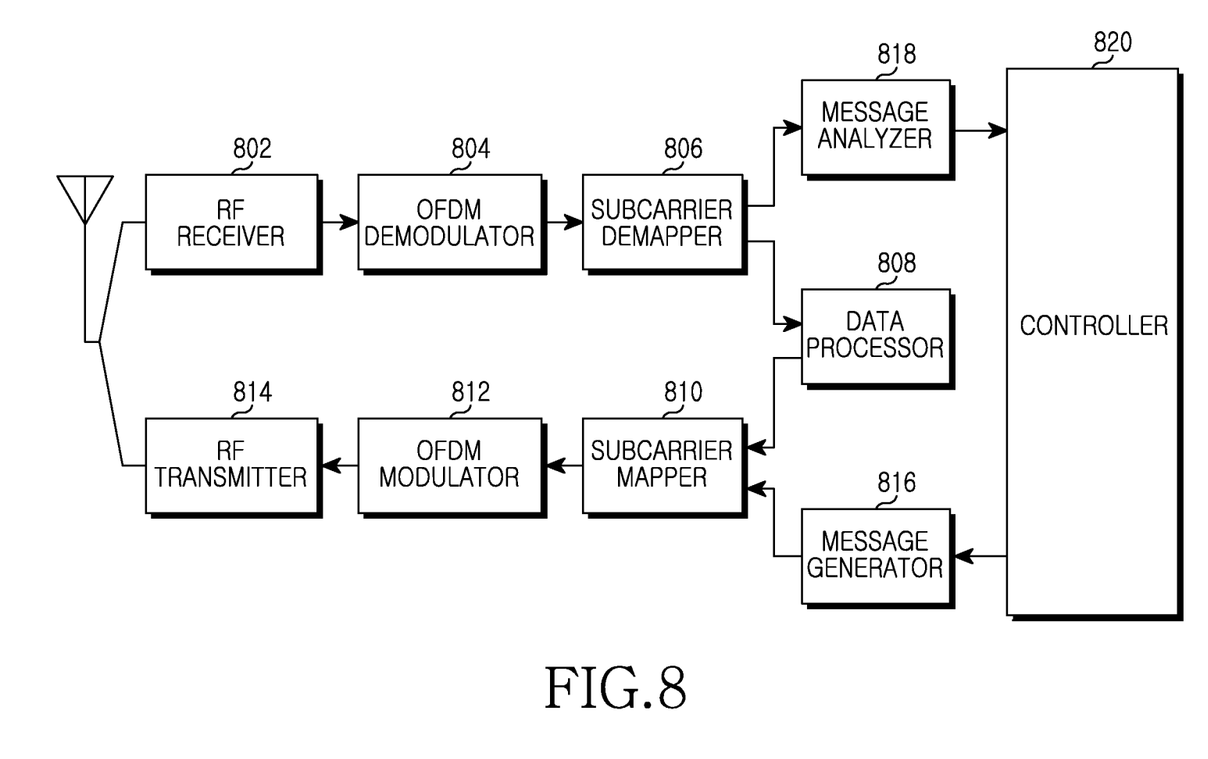
FIG. 8 is a block diagram of a terminal in a broadband wireless communication system according to an exemplary embodiment of the present invention.

FIG. 8 is a block diagram of a terminal in a broadband wireless communication system according to an exemplary embodiment of the present invention.

Referring to FIG. 8, a terminal includes an RF receiver 802, an OFDM demodulator 804, a subcarrier demapper 806, a data processor 808, a subcarrier mapper 810, an OFDM modulator 812, an RF transmitter 814, a message generator 816, a message analyzer 818, and a controller 820.

The RF receiver 802 converts an RF signal received via an antenna to a baseband signal. The OFDM demodulator 804 divides the baseband signal into OFDM symbols, removes the CP, and then restores the signals per subcarrier using the FFT. The subcarrier demapper 806 classifies the subcarrier signals based on the processing unit, and provides the data signals to the data processor 808 and the message signals to the message analyzer 818.

The data processor 808 restores the receive data bit sequence by demodulating and channel-decoding the data signals, and generates transmit data signals by channel-encoding and modulating the transmit data bit sequence.

The subcarrier mapper 810 maps data signals output from the data processor 808 and message signals output from the message generator 816 to subcarriers. The OFDM modulator 812 converts the signals mapped to the subcarriers to time-domain signals using the IFFT and constitutes OFDM symbols by inserting the CP. The RF transmitter 814 up-converts the OFDM symbols to an RF signal and transmits the RF signal over the antenna.

The message generator 816 generates a message bit sequence including the information fed from the controller 820, and generates physical message signals with the message bit sequence.

The message analyzer 818 restores the message bit sequence from the message signals received from the base station. The message analyzer 818 confirms information contained in the corresponding message signals by analyzing the message bit sequence, and provides the confirmed information to the controller 820. More particularly, the message analyzer 818 confirms the resource scheduling result for the terminal by analyzing the A-MAP IE. Herein, the confirmed resource scheduling result is used to transmit and receive the data signals to and from the base station.

The controller 820 controls functions of the terminal. For example, the controller 820 controls the subcarrier demapper 806 to extract the data signals from the allocated DL resource (i.e., the DL burst) confirmed by the message analyzer 818, and controls the subcarrier mapper 810 to map the data signals to the allocated UL resource (i.e., the UL burst) confirmed by the message analyzer 818. The controller 820 performs the processing corresponding to the information confirmed by the message analyzer 818, and provides the information contained in the transmit message to the message generator 816.

The operations of those blocks are explained below.

The RF receiver 802 and the OFDM demodulator 804 receive the DL subframe including the signal of the UL A-MAP IEs from the base station. The subcarrier demapper 806 extracts the signal of the UL A-MAP IEs in the received DL subframe and provides the extracted signal to the message analyzer 818. The message analyzer 818 determines the index of the received DL subframe. Herein, the DL subframe index can be determined using the preamble detected at the predefined location in the received DL subframe. Thereafter, the message analyzer 818 determines the number and the indexes of the UL subframes corresponding to the determined DL subframe index based on the ratio of the DL to the UL. Herein, the correspondence of the DL subframe and the UL subframes based on the ratio of the DL to the UL can be pre-stored as the look-up table and referred by the message analyzer 818, or determined by the message analyzer 818 based on the predefined equation. Herein, the ratio of the DL to the UL can be obtained from the control information relating to the frame constitution transmitted from the base station on the periodic basis (e.g., in every superframe) or in the event-trigger manner. Thereafter, the message analyzer 818 decodes the UL A-MAP IE and extracts the TTI and A-MAP relevance field value from the decoded UL A-MAP IE. The message analyzer 818 informs the controller 820 of the extracted TTI and A-MAP relevance field value. In so doing, according to the TTI type (i.e., the transmission length of the UL burst) for the UL burst allocated to the terminal and the UL subframe location (i.e., the transmission location of the UL burst) indicated by the TTI and A-MAP relevance field value, the controller 820 controls the subcarrier mapper 810 to transmit the UL data signals through the UL burst allocated to the terminal. More specifically, when determining that the TTI and A-MAP relevance field value indicates the long TTI, the controller 820 controls the subcarrier mapper 810 to transmit the UL data signal to the base station through the UL burst allocated to the terminal over the UL subframe corresponding to the received DL subframe or the long TTI region starting from the first UL subframe of the UL subframes corresponding to the received DL subframe. When the TTI and A-MAP relevance field value indicates the default TTI and the corresponding first UL subframe, the controller 820 controls the subcarrier mapper 810 to transmit the UL data signal to the base station through the UL burst allocated to the terminal in the first UL subframe of the UL subframes corresponding to the received DL subframe. When the TTI and A-MAP relevance field value indicates the default TTI and the corresponding second UL subframe, the controller 820 controls the subcarrier mapper 810 to transmit the UL data signal to the base station through the UL burst allocated to the terminal in the second UL subframe of the UL subframes corresponding to the received DL subframe. When the TTI and A-MAP relevance field value indicates the default TTI and the corresponding third UL subframe, the controller 820 controls the subcarrier mapper 810 to transmit the UL data signal to the base station through the UL burst allocated to the terminal in the third UL subframe of the UL subframes corresponding to the received DL subframe.

As set forth above, based on the correspondence of the DL subframes and the UL subframes defined by the ratio of the DL to the UL in the TDD frame including the asymmetric links, the broadband wireless communication system utilizes the indicator indicating not only the UL subframe location (e.g., the first UL subframe, the second UL subframe, and the third UL subframe) for the burst allocation indicated by the A-MAP IE transmitted over the DL subframe but also the burst transmission characteristic (e.g., the default TTI and the long TTI). Therefore, the burst allocation of various characteristics can be indicated without additional signaling overhead. Furthermore, by indicating the burst allocation of various characteristics, it is possible to avoid the resource loss when only the burst allocation of the particular characteristic (e.g., the long TTI) is considered.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a terminal in a wireless communication system, the operating method comprising:
   receiving uplink (UL) resource allocation information through a downlink (DL) subframe;
   identifying at least one UL subframe corresponding to the DL subframe based on a ratio of the DL to the UL;
   identifying, based on the UL resource allocation information, a number of the at least one UL subframe, and at least one index of the at least one UL subframe, a 2-bit value indicating a transmission time interval (TTI) type and a location of one UL subframe within the at least one UL subframe; and
   transmitting UL data based on the location of the UL subframe and the TTI type indicated by the 2-bit value of the UL resource allocation information,
   wherein the 2-bit value is set to one of:
   '00' indicating that the TTI type is a long TTI,
   '01' indicating that the TTI type is a default TTI and a first UL subframe within the at least one UL subframe,
   '10' indicating that the TTI type is the default TTI and a second UL subframe within the at least one UL subframe, and
   '11' indicating that the TTI type is the default TTI and a third UL subframe within the at least one UL subframe.

2. The operating method of claim 1, wherein, when the TTI type is the long TTI, transmitting the UL data through three UL subframes.

3. The operating method of claim 1, wherein, when the TTI type is the default TTI, transmitting the UL data through one UL subframe having a location indicated by the TTI type.

4. The operating method of claim 1, wherein the UL resource allocation information comprises an UL basic assignment A-MAP information element (IE).

5. An operating method of a base station in a wireless communication system, the operating method comprising:
   encoding uplink (UL) resource allocation information including a 2-bit value indicating a transmission time interval (TTI) type and a location of one UL subframe within at least one UL subframe; and
   transmitting the UL resource allocation information to a terminal through a downlink (DL) subframe; and
   receiving UL data based on the location of the UL subframe and the TTI type indicated by the 2-bit value,
   wherein the 2-bit value is identified, by the terminal, based on the UL resource allocation information, a number of the at least one UL subframe, and at least one index of the at least one UL subframe corresponding to the DL subframe, and
   wherein the 2-bit value is set to one of:
   '00' indicating that the TTI type is a long TTI,
   '01' indicating that the TTI type is a default TTI and a first UL subframe within the at least one UL subframe,
   '10' indicating that the TTI type is the default TTI and a second UL subframe within the at least one UL subframe, and
   '11' indicating that the TTI type is the default TTI and a third UL subframe within the at least one UL subframe.

6. The operating method of claim 5, wherein, when the TTI type is the long TTI, receiving, from the terminal, the UL data through three UL subframes.

7. The operating method of claim 5, wherein, when the TTI type is the default TTI, receiving, from the terminal, the UL data through one UL subframe having a location indicated by the TTI type.

8. The operating method of claim 5, wherein the UL resource allocation information comprises an UL basic assignment A-MAP information element (IE).

9. An apparatus of a terminal in a wireless communication system, the apparatus comprising:
   a receiver configured to receive uplink (UL) resource allocation through a downlink (DL) subframe; and
   a processor configured to identify at least one UL subframe corresponding to the DL subframe based on a ratio of the DL to the UL, identify, based on the UL resource allocation information, a number of the at least one UL subframe, and at least one index of the at least one UL subframe, a 2-bit value indicating a transmission time interval (TTI) type and a location of one UL subframe within at least one UL subframe; and
   a transmitter configured to transmit UL data based on the location of the UL subframe and the TTI type indicated by the 2-bit value of the UL resource allocation information,
   wherein the 2-bit value is set to one of:
   '00' indicating that the TTI type is a long TTI,
   '01' indicating that the TTI type is a default TTI and a first UL subframe within the at least one UL subframe,
   '10' indicating that the TTI type is the default TTI and a second UL subframe within the at least one UL subframe, and
   '11' indicating that the TTI type is the default TTI and a third UL subframe within the at least one UL subframe.

10. The apparatus of claim 9, wherein the transmitter is configured to transmit the UL data through three UL subframes, when the TTI type is the long TTI.

11. The apparatus of claim 9, wherein the transmitter is configured to transmit the UL data through one UL subframe having a location indicated by the TTI type, when the TTI type is the default TTI.

12. An apparatus of a base station in a wireless communication system, the apparatus comprising:
   a processor configured to encode uplink (UL) resource allocation information including a 2-bit value indicating a transmission time interval (TTI) type and a location of one UL subframe within at least one UL subframe; and
   a transmitter configured to transmit the UL resource allocation information to a terminal through the a downlink (DL) subframe, and to receive UL data based on the location of the UL subframe and the TTI type indicated by the 2-bit value,
   wherein the 2-bit value is identified, by the terminal, based on the UL resource allocation information, a number of the at least one UL subframe, and at least one index of the at least one UL subframe corresponding to the DL subframe,
   wherein the 2-bit value is set to one of:
   '00' indicating that the TTI type is a long TTI,
   '01' indicating that the TTI type is a default TTI and a first UL subframe within the at least one UL subframe,
   '10' indicating that the TTI type is the default TTI and a second UL subframe within the at least one UL subframe, and '11' indicating that the TTI type is the default TTI and a third UL subframe within the at least one UL subframe.

13. The apparatus of claim 12, wherein the receiver is configured to receive, from the terminal, the UL data through three UL subframes, when the TTI type is the long TTI.

14. The apparatus of claim 12, wherein the receiver is configured to receive, from the terminal, the UL data through one UL subframe, when the TTI type is the default TTI.

* * * * *